(12) United States Patent
Haubmann

(10) Patent No.: US 7,236,225 B2
(45) Date of Patent: Jun. 26, 2007

(54) SYNCHRONIZATION DEVICE

(75) Inventor: Michael Haubmann, Vienna (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 201 days.

(21) Appl. No.: 10/510,174

(22) PCT Filed: Mar. 28, 2003

(86) PCT No.: PCT/DE03/01115

§ 371 (c)(1),
(2), (4) Date: Nov. 29, 2004

(87) PCT Pub. No.: WO03/085961

PCT Pub. Date: Oct. 16, 2003

(65) Prior Publication Data

US 2005/0078277 A1 Apr. 14, 2005

(30) Foreign Application Priority Data

Apr. 5, 2002 (DE) .................. 102 16 218

(51) Int. Cl.
*G03B 31/00* (2006.01)
(52) U.S. Cl. ............................. 352/12; 352/4
(58) Field of Classification Search .............. 352/4, 352/12, 3, 22, 90
See application file for complete search history.

(56) References Cited

U.S. PATENT DOCUMENTS

| 4,483,599 | A | * | 11/1984 | MacRae et al. | ............... 352/22 |
| 4,646,167 | A | | 2/1987 | Denecke | |
| 5,457,507 | A | * | 10/1995 | Berardi | ........................... 352/3 |
| 5,638,151 | A | | 6/1997 | Berardi | |
| 6,621,552 | B2 | * | 9/2003 | Bauer | ......................... 352/12 |
| 6,831,729 | B1 | * | 12/2004 | Davies | .......................... 352/3 |
| 7,042,537 | B2 | * | 5/2006 | Kanazawa et al. | .......... 349/106 |

FOREIGN PATENT DOCUMENTS

GB 2 129 590 A 5/1984

OTHER PUBLICATIONS

English translation of International Preliminary Examination Report for International application No. PCT/DE2003/001115, International filing date of Mar. 28, 2003, in the name of Arnold & Richter Cine Technik GmbH & Co. Betriebs KG et al.

(Continued)

*Primary Examiner*—Rodney Fuller
(74) *Attorney, Agent, or Firm*—Christie, Parker & Hale, LLP

(57) ABSTRACT

A synchronization device for providing an optical synchronization signal in computer controlled picture recordings of a motion picture camera is provided. The synchronization device includes a signaling device for generating an optical synchronization signal, whereby the optical synchronization signal of the synchronization device is triggered by a computer that controls the picture recordings. By providing a number of optical signaling elements, the signaling device is configured to provide different optical signals for synchronizing the picture recording of the motion picture camera.

9 Claims, 2 Drawing Sheets

OTHER PUBLICATIONS

Figure 1A:
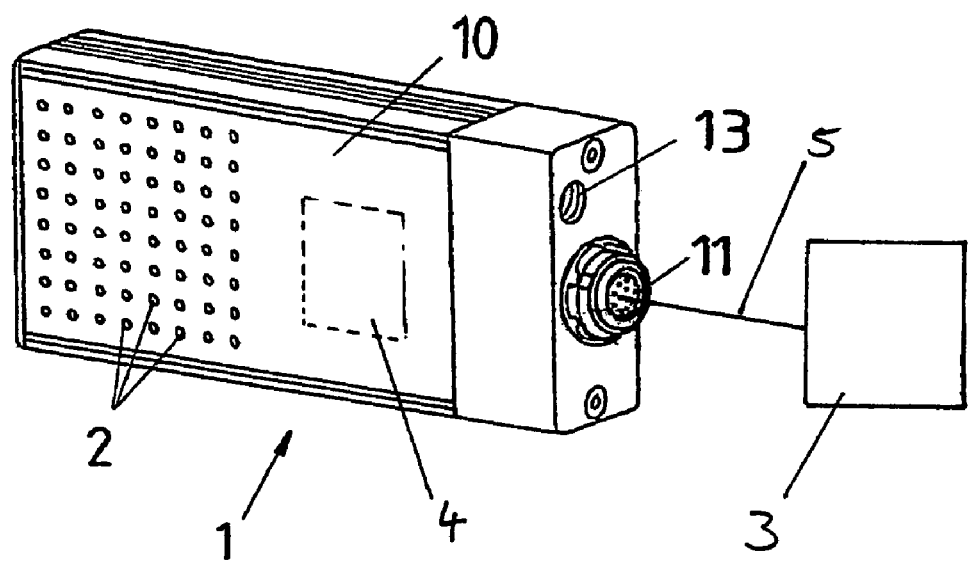

International Search Report of PCT/DE2003/001115, dated Jan. 19, 2004.
Denecke, Inc., "Dcode TS-3" Apr. 2001, U.S.A., 2 pages.
Trew Audio, Inc., "The Mixer" vol. 4, No. 2, Jun. 1999. U.S.A., pp. 1-9, 12, and 2 additional pages.
Ambient Recording GmbH, "Clockit Master Slate ACD 201/301" Timecode Slate 1996-1999, 17 pages.
Ledyoung, Ledyoung Technology Corporation, "LYT-5880/1F-XXX Series Data Sheet, 2.3 inch 5.0mm diameter 8×8 full color dot matrix display" Jul. 30, 1999, pp. 1-3, and 2 additional pages.
Ledtronics, Inc., The Future of Light, "LED Hi-Power Outdoor and Standard Power Indoor LEDs 5 & 8mm Full Spectrum RGB LEDs" 1998, U.S.A., 2 pages.

* cited by examiner

SYNCHRONIZATION DEVICE

The invention relates to a synchronisation device according to the preamble of claim 1.

A synchronisation device of this kind serves to prepare an optical synchronisation signal for computer-controlled picture recordings of a motion picture camera. For this the synchronisation device has a signalling device for generating an optical synchronisation signal whereby the optical synchronisation signal can be initiated by means of the computer which controls the picture recordings.

In film productions computer-controlled camera moves are often carried out (motion control). In order to achieve a simpler synchronisation of the individual takes of such computer-controlled motion controls a synchronisation device is used termed a "bloop-light". This synchronisation device comprises a light source which is triggered by the computer which controls the camera motion at a specific point in time after the start of the take. The light source of the synchronisation device is positioned in the initiation time point in the recording picture of the motion picture camera. From the computer-controlled illumination of the light source it is readily possible to determine the synchronising time point of the individual takes in the subsequent finishing process.

Synchronisation devices of this kind therefore fulfil the function of a type of electronic shutter as used for the synchronisation of sound and picture recordings of a motion picture camera. As opposed to the electronic shutter it is possible through the generic synchronisation device to synchronise a number of computer-controlled picture recordings.

From the prior art synchronisation devices are known which normally contain a single light source for generating the optical synchronisation signal. This has the drawback that with such synchronisation devices only the generation of a single optical synchronisation signal is possible.

It is therefore the object of the present invention to produce a synchronisation device with which different optical synchronisation signals can be generated.

This is achieved through a synchronisation device having the features of claim 1.

According to the invention it is proposed that the signalling device of the synchronisation device has a number of optical signalling elements for generating optical synchronisation signals.

By means of a signalling device having a number of optical signalling elements it is possible to obtain a corresponding number of different optical synchronisation signals according to the combination possibilities which are provided by the number of optical signalling elements.

With for example only two optical signalling elements already three different optical synchronisation signals can be produced (both optical signalling elements active, only the first signalling element active, only the second signalling element active). A larger number of optical signalling elements enables a corresponding larger number of optical synchronisation signals to be generated.

By optical signalling elements are therefore meant both structural elements which for generating an optical signal themselves emit light and also structural elements which can be switched to and from between states which during illumination of the synchronisation device with light are perceived as different optical signals.

In a preferred embodiment the signalling device of the synchronisation device has optical signalling elements which are arranged in the form of a digital display for letters and/or numbers. Individual optical signalling elements thereby represent individual segments of the letters and/or numbers to be displayed. In this way a number of different optical synchronisation signals can be generated in the form of letters and/or numbers or combinations thereof.

In a second preferred embodiment, the optical signalling elements of the signalling device are arranged in the form of a matrix. The number of optical synchronisation signals which can be displayed is thereby solely defined by the resolution of the matrix, i.e. the number of optical signalling elements arranged in lines and columns. Thus symbols and designs can also be generated as optical synchronisation signals in a matrix in addition to the conventional letters and/or numbers and combinations thereof.

The arrangement of the optical signalling elements in a matrix thus enables an even more flexible generation of an even larger number of optical synchronisation signals compared with the arrangement as a digital display.

The synchronisation device preferably has optical signalling elements which are formed as light-emitting light elements. A safe visible generation of the optical synchronisation signal required is thereby guaranteed independently of the lighting conditions of the scene which is to be recorded.

The signalling device of the synchronisation device is advantageously mounted in a housing whereby the optical signalling elements are visible on at least one surface of the housing. This housing can be small, robust and compact and thus suitable for use at the various film locations.

It is expedient if the housing comprises a control electronics for the signalling device and a control interface for connection to a computer. Either the energy supply of the synchronisation device is provided likewise through the control interface or an inherent energy supply through batteries and/or accumulators is provided in the housing. In a preferred embodiment the control interface can be connected to a CAN Bus system.

It is particularly advantageous if the optical signalling elements of the synchronisation device comprise light-emitting diodes (LED). LEDs are particularly suitable when compared with conventional light means with incandescent coils owing to their high degree of efficiency (low energy consumption), their insensitivity to shudders and their long service life. Furthermore they reach the desired light intensity within few micro seconds and die out equally quickly when switched off which is particularly important in the case of high speed recordings.

The light-emitting diodes are preferably suitable for controllable additive colour mixing of the light generated by the optical signalling element. The possibility thus arises of generating additional optical synchronisation signals by means of the adjustable light colour of the LEDs. Furthermore with such LEDs the intensity of the emitted light can be accurately matched to the sensitivity of the film material used.

In a further preferred embodiment the synchronisation device has an interface for connection to a light device for projection of an optical synchronisation signal. If the clip or detail to be recorded by the motion picture camera is to be so small that the synchronisation device cannot be brought in sufficiently into the picture clip then an additional lighting device can be connected to the synchronisation device through a corresponding interface. This external lighting device is designed so that an optical synchronisation signal can be projected with it into the small picture clip. As a result of the high optical performance with small geometric dimensions laser diodes are particularly suitable as a light source for an additional connectable lighting device.

In order to be able to generate with the laser diode a number of optical synchronisation signals the lighting device is to be equipped with an additional projection lens. Such a projection lens should enable the laser diode beam to be manipulated into different geometric patterns.

So-called holographic optical elements (HOE) or diffractive optical elements (DOE) are particularly suitable for this purpose. With these very small compact lenses it is possible to generate any geometric pattern which has significantly the same size and sharpness over a radiating range of many meters.

Further advantages of the invention will now be explained with reference to the embodiments given by way of example with reference to the accompanying drawings.

Figure 1B:
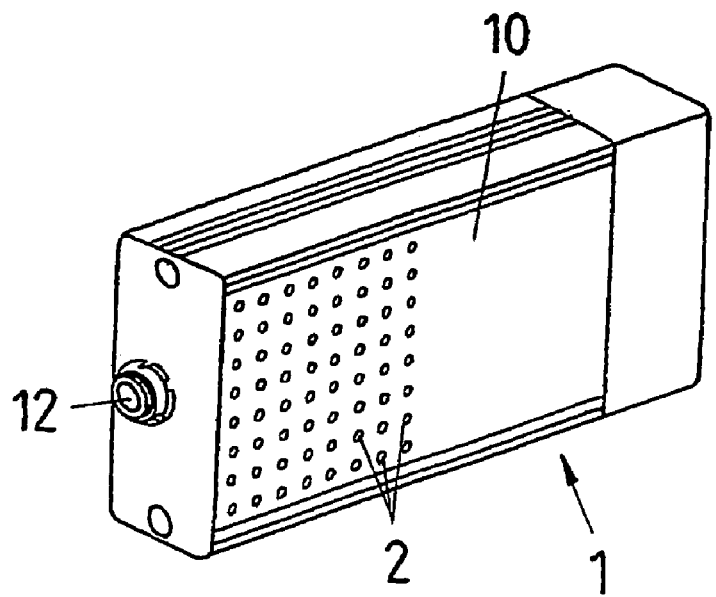
Figure 2:
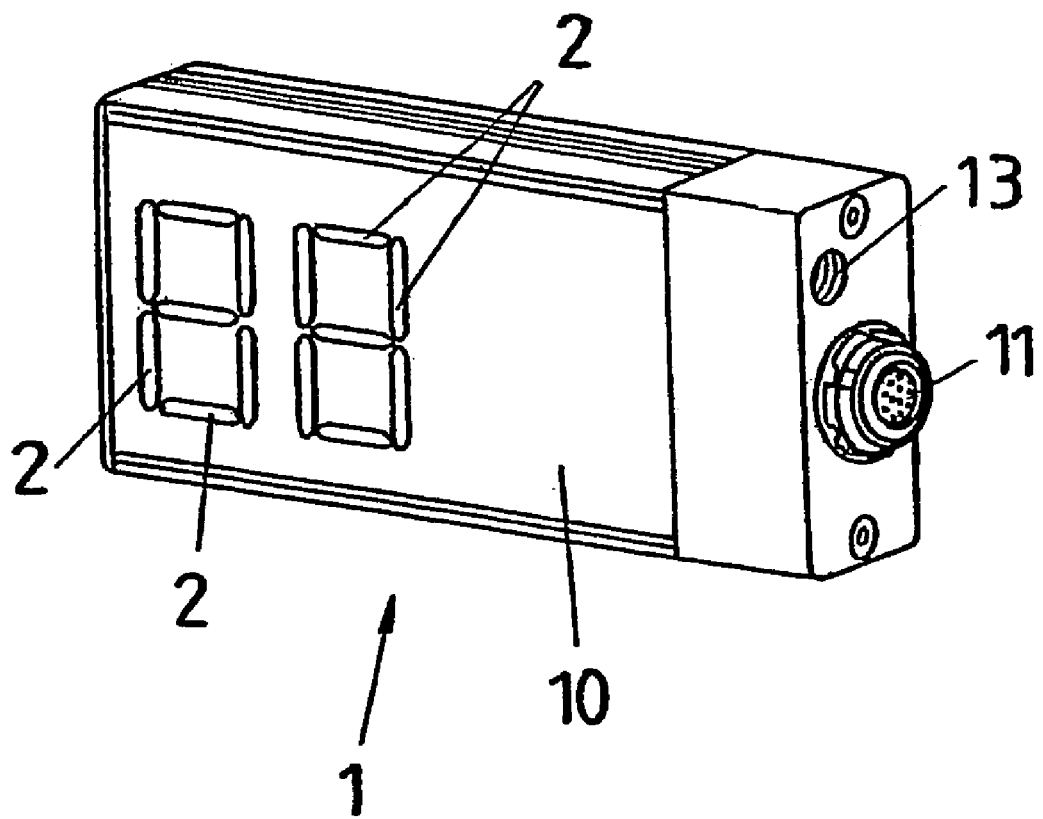

They show:

FIG. 1a a perspective view of a first embodiment of the synchronisation device;

FIG. 1b a further perspective view of the first embodiment of the synchronisation device of FIG. 1 and FIG. 2 a perspective view of a second embodiment of the synchronisation device.

FIG. 1a shows a first exemplary embodiment of a synchronization device 1 having a square housing 10 in a side perspective view. On a side face of the housing is the control interface 11 for connection of the synchronization device 1 to the computer 3 of a computer-controlled recording device (motion control) of a motion picture camera. This control interface 11 can be designed so that it can be connected to a CAN Bus system 5 which is typical for motion-control systems.

On the same side face of the housing there is furthermore an internal thread 13 which enables the synchronisation device 1 to be fixed onto an associated support element of the camera system.

On the surface of another side face are mounted as optical signaling elements 64 light elements 2 equidistant from each other in an 8×8 matrix. Each of the 64 light elements 2 comprises at least one light-emitting diode (LED). By means of a signaling device (not shown) mounted inside the housing 10 and comprising a control electronics 4 for the light elements 2 it is possible to control the 64 light elements 2. The light elements 2 in an exemplary embodiment, each have at least three LEDs designed for additive color mixing. In this way the color tone and intensity can be individually controlled for the emitted light of each light element 2.

The synchronisation device 1 receives the signals for controlling the light elements 2 through the control interface from the computer of the motion-control system. Thus by means of the 8×8 matrix which is formed by the light elements 2 a number of letters and/or numbers, symbols, patterns and combinations thereof can be displayed as optical synchronisation signals. Furthermore these optical synchronisation signals can be adjusted in colour and intensity to the relevant conditions, i.e. lighting situation of the scene to be recorded, sensitivity of the film material.

When using the synchronisation device 1 at the recording site the computer of the motion control system causes the synchronisation device 1 at the start of the first recording take to see in the scene and initiates the desired optical synchronisation signal at a defined time point of the computer-assisted camera run. After this the synchronisation device 1 is removed from the scene and the take is recorded up to the end. After the start of the second take the synchronisation device 1 is again positioned in the scene and exactly at the same time point after the start of the second take the computer of the motion-control system again initiates the optical synchronisation signal. The synchronisation signal is removed from the scene and the second take is turned off. The procedure is repeated according to the same plan for each further additional take. It is likewise possible to record the optical synchronisation signal at the end of each take by means of the synchronisation device 1.

Instead of the control interface 11 it would likewise be conceivable to design the synchronisation device 1 with a cable-less radio or infrared interface. For this however a separate energy supply would be necessary through batteries or accumulators stored in the housing 10. With the embodiments of the synchronisation device 1 illustrated in FIGS. 1a, 1b and 2 the energy supply is provided through separate poles at the control interface 11 provided for this purpose.

FIG. 1b shows the first embodiment of the synchronisation device 1 in a perspective view turned 90 degrees relative to FIG. 1a. On the side face of the housing 10 opposite the control interface 11 the synchronisation device 1 has an interface 12 for connecting an external lighting device for the projection of an optical synchronisation signal into a scene which is to be recorded.

In the event that the peripheral conditions of the scene to be recorded do not permit the synchronisation device 1 for generating the optical synchronisation signal to be mounted in the scene an additional external lighting device can be connected to the synchronisation device 1 through the interface 12. By means of this external lighting device an optical synchronisation signal can be projected into the scene being recorded provided that the lighting device is suitably aligned. The triggering of this projected optical synchronisation signal is in turn undertaken by the computer of the motion-control system through the control interface 11 and the interface 12.

FIG. 2 shows a second embodiment of a synchronisation device 1 according to the invention from the same perspective as FIG. 1a. The same structural elements are thereby marked with the same reference numerals.

As opposed to the embodiment illustrated in FIGS. 1a and 1b the synchronisation device 1 in FIG. 2 has lighting elements 2 which are arranged in the form of a two-position digital display. All the numbers and/or single letters and combinations thereof can be generated by means of the illustrated digital display as optical synchronisation signals.

By means of suitable lighting elements 2 and a corresponding control electronics (not shown) it is possible to adjust the intensity and colour tone of the light emitted from the lighting elements 2 even with this embodiment.

It is clear that the synchronisation device according to the invention can be obtained in addition to as above also with a large number of further optical signalling elements which come into question. The type of generation of the optical signal by means of the optical signalling elements can be preset in many ways (plasma light source, liquid crystal display, luminescent light sources or purely mechanical display elements). Essential to the invention is only that a number of optical synchronisation signals can be generated through the combination of at least two optical signalling elements.

The invention claimed is:

1. A synchronization device for preparing an optical synchronization signal in a computer-controlled picture recording of a motion picture camera comprising:

a signaling device for generating an optical synchronization signal in response to a signal from a computer controlling the picture recording, said signaling device being connectable to the synchronization device via a control interface,
wherein the signaling device comprises a plurality of optical signaling elements for generating the optical synchronization signal, the optical signaling elements being arranged in a shape of a matrix and comprising light-emitting diodes that are configured to provide controllable additive color mixing of a light generated by the optical signaling elements to generate the optical synchronization signal.

2. The synchronization device according to claim 1, wherein the optical signaling elements of the signaling device are arranged in the form of a digital display for displaying symbols.

3. The synchronization device according to claim 1, wherein the signaling device is mounted in a housing, wherein the optical signaling elements are visible on at least one surface of the housing.

4. The synchronization device according to claim 3 wherein the housing comprises control electronics of the signaling device and a control interface for connection to the computer.

5. The synchronization device according to claim 1, wherein the control interface is connectable to a CAN bus system.

6. The synchronization device according to claim 1, wherein the synchronization device comprises an interface for connection of a light device for the projection of an optical synchronization signal.

7. The synchronization device according to claim 2 wherein the symbols are selected from the group of signals consisting of letters and numbers.

8. A synchronization device for preparing an optical synchronization signal in a computer-controlled picture recording of a motion picture camera, the synchronization device comprising a signaling device for generating an optical synchronization signal in response to a signal from a computer controlling the picture, and wherein the signaling device comprises a number of optical signaling elements for generating the optical synchronization signal, and wherein the optical signaling elements comprise light-emitting diodes.

9. A synchronization device for preparing an optical synchronization signal in a computer-controlled picture recording of a motion picture camera, the synchronization device comprising a signaling device for generating an optical synchronization signal in response to a signal from a computer controlling the picture, wherein the signaling device comprises a number of optical signaling elements for generating the optical synchronization signal, and wherein the optical signaling elements provide for color mixing.

* * * * *